United States Patent Office 2,981,414
Patented Apr. 25, 1961

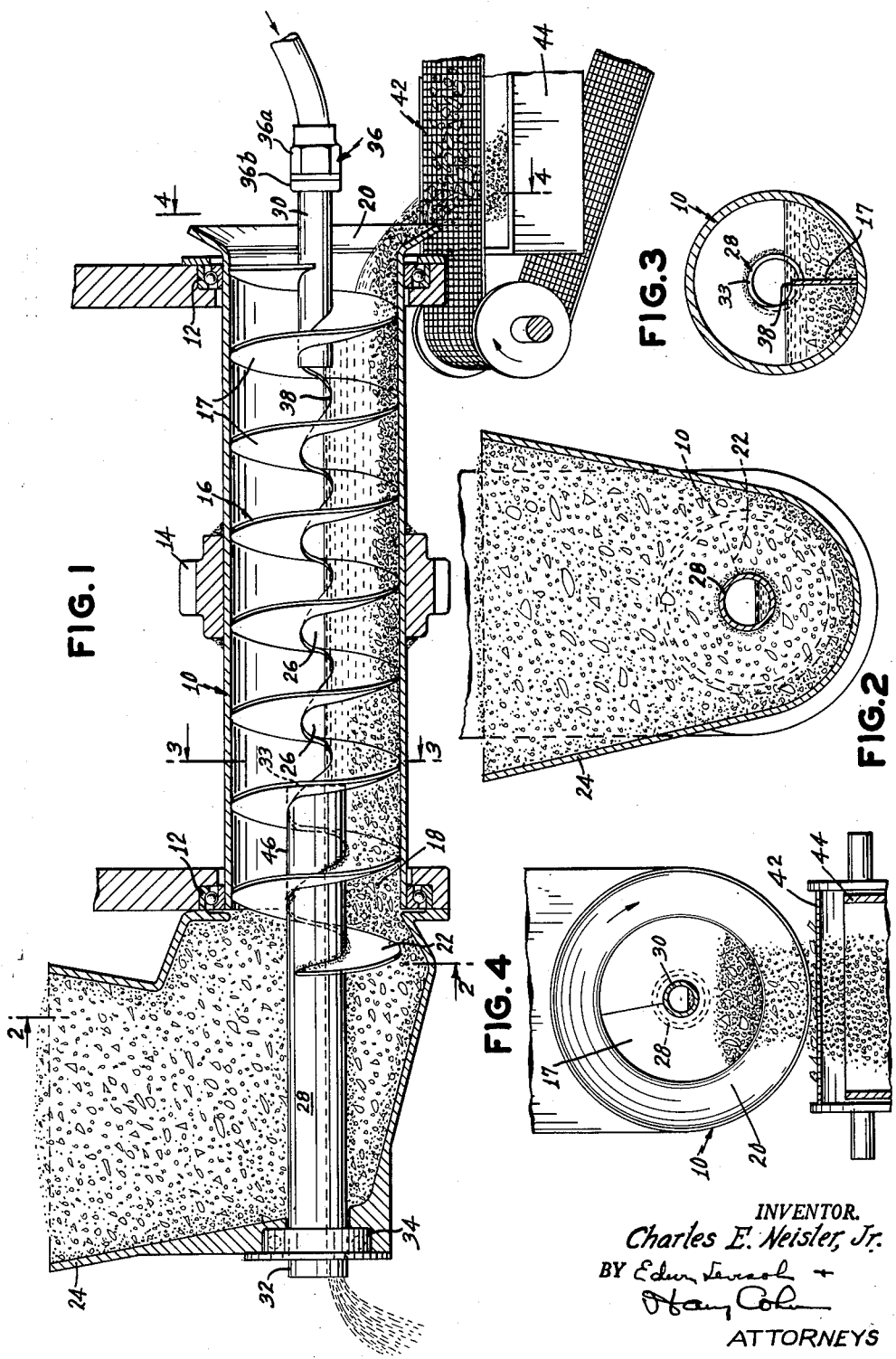

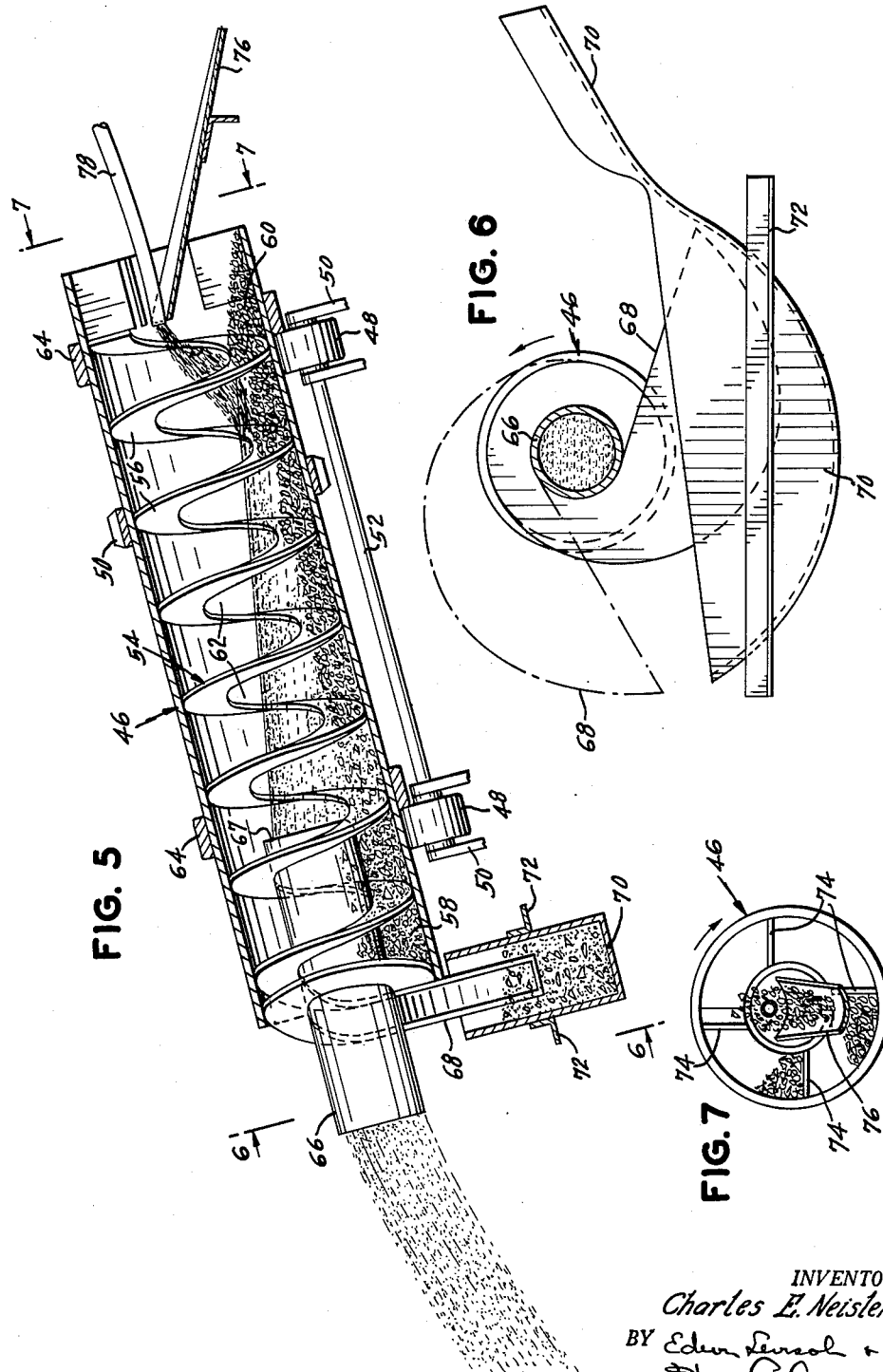

2,981,414
METHOD AND APPARATUS FOR SEPARATING FINE MATERIAL FROM COARSE MATERIAL

Charles Eugene Neisler, Jr., Kings Mountain, N.C.

Filed Aug. 8, 1958, Ser. No. 754,026
3 Claims. (Cl. 209—452)

This invention relates to an apparatus and method for separating fine material from coarse material, for example; clay or mud, etc. from gravel or mica, etc., or fine aggregate from coarse aggregate.

One object of the invention, therefore, is to provide improved means and a method for separating fine material from coarse material.

Another object is the provision of a separation method and apparatus wherein a stream of water is employed in conjunction with a revolving drum having a screw conveyor therein for accomplishing the separation of fine material from coarse material and wherein the water is discharged from the drum beyond the inlet end thereof so as not to wet the material introduced at the inlet end of the drum for the separation operation.

A still further object of the invention is to provide means for permitting the separating fluid to flow in a direction opposite to the direction of flow of the mixed coarse and fine material.

Other objects and advantages of the invention will be apparent from a consideration of the following detailed description taken in connection with the accompanying drawings in which:

Fig. 1 is a diagrammatic elevational view, partly in section, illustrating the arrangement of one embodiment of the invention;

Fig. 2 is a vertical sectional view taken on line 2—2 of Fig. 1;

Fig. 3 is a vertical sectional view taken on line 3—3 of Fig. 1;

Fig. 4 is a vertical view taken on line 4—4 of Fig. 1.

Fig. 5 is a diagrammatic elevational view, partly in section, illustrating the arrangement of another embodiment of the invention;

Fig. 6 is a vertical view taken on line 6—6 of Fig. 5; and

Fig. 7 is a vertical view taken on line 7—7 of Fig. 6.

Referring now to the drawings in detail, there is shown a drum 10 which is mounted in any suitable means, as in bearings 12, for rotation about its longitudinal axis. The drum may be rotated by any suitable means such as by a driven gear 14 affixed to drum 10.

A helical screw conveyor 16, having vanes 17, is welded to the internal surface of drum 10 whereby mixed coarse and fine material supplied to the inlet 18 of said drum is moved longitudinally to the outlet end 20 thereof during the rotation of the drum. One end 22 of the helical screw conveyor 16 is disposed in supply bin 24, so that mixed coarse and fine material from said bin is conveyed axially by the screw conveyor into and through drum 10 to the outlet end 20. Screw conveyor 16 is provided along its axis with aligned holes 26 which provide mounting means for a fluid discharge pipe 28 and a water inlet tube 30 as well as providing a continuous channel through which the fluid may travel from the inlet tube to the discharge pipe. Outlet end 20 of drum 10 may be elevated slightly to assist in the flow of water from the inlet tube 30 to the discharge pipe 28. While level, or slightly inclined downwardly from outlet end 20 drum 10 will be effective in separating clay or mud from coarse aggregate or mica. In this position of the drum turbulence of the flowing water is kept to a minimum to prevent the fine material from flowing away from the coarse material as they are separated. Turbulence may be further reduced by rotating the drum slowly. When drum 10 is inclined about 20 to 30° as shown in the embodiment of Figure 5, the apparatus will be effective in separating fine mica and fine aggregate from coarse mica and coarse aggregate, as will be understood more fully hereinafter. Discharge pipe 28 is affixed to the edges of the aligned holes, at inlet 18, as by welding, to insure a watertight connection therewith, and inlet tube 30 is also affixed to the edges of the conveyor holes, at outlet 20, as by welding, for a watertight connection therewith.

The discharge end 32 of discharge pipe 28 is supported in bearing 34 for rotation with drum 10. Inlet end 33 of the discharge pipe 28 extends axially into drum 10 and is spaced from inlet 18 of the drum to prevent wetting of the mixed material being introduced into the drum at inlet 18. Tube 30 may be affixed to a fluidtight coupling 36 joining the tube to a source of fluid supply. Coupling 36 has the relatively rotatable parts 36a and 36b so that tube 30 and part 36b can rotate while part 36a is stationary. As couplings of this type are well known, further description thereof is considered unnecessary.

A belt conveyor 42, which may be in the form of a screen, is positioned at the outlet end 20 of the drum to receive the wetted coarse material and fluid containing fine material suspended therein. A container 44 may be placed under the belt conveyor if so desired to receive the fine material which passes through the meshes of the screen conveyor 42 while the coarse material is retained on the conveyor.

In the operation of the apparatus, the mixed coarse and fine material, which may be gravel or sand mixed with clay or muddy material, is picked up by screw conveyor 16 from bin 24, or another source, and is moved toward the outlet end 20 of the drum as the drum rotates in a clockwise direction, as viewed in Figure 4. Water or other fluids, which is supplied through tube 30, causes the clay or muddy material to be separated from the sand or gravel by reason of the suspension of the clay or muddy material in the water. The water having some of the suspended fine material contained therein will spill over the lower edges 38 of holes 26 in the screw conveyor as the water travels from right to left, as viewed in Figure 1, and is discharged through pipe 28. Discharge pipe 28, being in watertight relation with the adjacent portions of conveyor 16 prevents the passage of water from drum 10 into bin 24. Being of sufficient capacity, the discharge pipe will prevent the level of the water from rising above upper surface 46 of the discharge pipe and flowing back into bin 24. The separated coarse material and remaining fluid with fine material suspended therein will be discharged at 20.

Further separation may occur on screen conveyor 42 as fluid and fine material suspended therein will pass through the meshes of the screen into container 44 as the wetted separated coarse material is removed by conveyor 42.

The embodiment of the invention shown in Figs. 5–7 has a drum 46, which is mounted on rollers 48 for rotation about its longitudinal axis, by any suitable means such as by a driven gear 50. Rollers 48 are suitably mounted, for rotational support in brackets 50 which may be connected to each other by a shaft 52. A helical screw conveyor 54, having vanes 56, is welded to the internal surface of drum 46, whereby upon rotation of the drum, mixed coarse and fine material supplied to the inlet 58 of the drum is moved longitudinally through the drum to the outlet 60 thereof. The drum 46 is inclined along its longitudinal axis about 20° to 30° so that outlet 60 of the drum is above inlet 58. Bearing stops 64 are affixed to the outer surface of drum 46, which bear against rollers 48, to prevent drum 10 from sliding downwardly. Screw conveyor 54 is provided along its longitudinal axis with axially aligned holes 62. A discharge pipe 66 having an inlet 67, projects into inlet end 58 of the drum 46 and is mounted in the holes 62 of the conveyor 54, at the inlet thereof. Discharge pipe 66 is affixed to conveyor 54, as by welding, to insure a watertight connection therewith.

Mounted on the inlet of conveyor 54 and merging with the vanes 56 thereat is a scoop 68 which projects out from and below drum 46 into a supply bin 70 which contains mixed coarse and fine material. Supply bin 70 may be suitably supported by any convenient means such as by brackets 72.

The outlet end 60 of drum 46 has four plates 74, spaced equidistant around the internal surface of drum 46, each plate being welded to extend perpendicularly from the internal surface of the drum. These plates comprise lifting means to lift the separated coarse material from the outlet end 60 of drum 46 into a discharge hopper 76, which may be supported by suitable means not shown.

A fluid supply pipe 78 projects into the discharge end 60 of the drum and furnishes separating fluid for the drum. Supply pipe 78 may be supported by any convenient means, not shown.

Operation of the apparatus is as follows. Drum 46 is caused to rotate about its longitudinal axis in a counterclockwise direction, as viewed in Figure 6. As the bottom portion of scoop 68 descends into supply bin 70, a supply of mixed fine and coarse material, such as mixed fine and coarse aggregate, as gravel, will be scooped up and conveyed, by screw conveyor 54, from inlet 58 toward the outlet 60 of the drum. The action of the scoop, as it rotates with the conveyor, may be best seen in Figure 6. Separating fluid, such as water, is continuously introduced into drum 46 through supply pipe 78, in sufficient quantities to cascade over the lower edges of holes 62 in the screw conveyor 54 as the water flows from supply pipe 78 to discharge pipe 66. Due to the steep incline of drum 46 the flow of water to the discharge pipe 66 will be in a turbulent condition as it cascades over the screw conveyor, thoroughly mixing with the advancing mixture of coarse and fine material, causing the finer material to separate from the coarse material and becomes suspended in the oncoming water to be discharged therewith through discharge pipe 66. It will be noted that the inlet 67 of discharge pipe 66 projects into drum 46 thereby precluding the possibility of discharging fluid from wetting the incoming mixed fine and coarse material. As the separated coarse material reaches the discharged end 60 of the drum it will be scooped up and carried by plates 74 to the level of the inlet of discharge hopper 76 where it will be discharged by gravity as best seen in Figure 7. Most of the water introduced into the drum will be discharged through discharge pipe 66 and only small amounts will reach discharge end 60 of the drum. This embodiment of the invention, wherein the drum is sharply inclined causing turbulence of the water as it cascades over the screw conveyor, causes the fine material to flow downwardly with the water while the coarse material will be moved in the opposite direction by the screw conveyor.

While I have shown and described the preferred embodiment of my invention, it will be understood that various changes may be made in the idea or principles of the invention within the scope of the appended claims.

Having thus described my invention, what I claim and desire to secure by Letters Patent is:

1. Apparatus for separating mixed coarse and fine material, comprising rotary drum means having an inlet end and a discharge end, bin means having an opening communicating with the inlet end of said drum means for supplying material to said drum means, a screw conveyor mounted within said drum means in watertight connection therewith along the internal surface thereof, said screw conveyor extending into said bin through the opening in the latter for moving material from said bin means through said drum means, said conveyor means having axially aligned openings throughout its length, said openings at the inlet end of said drum means comprising mounting means for a discharge pipe, said openings at the discharge end of said drum means comprising mounting means for a fluid inlet tube, said pipe and said tube being fastened to said mounting means in a watertight connection thereto and extending into said drum means for preventing intermingling of said mixed coarse and fine material with fluid from said inlet tube being discharged through said discharge pipe.

2. Apparatus for separating finely divided material from coarse material contained in a supply mixture of said materials, comprising a drum mounted for rotation about its longitudinal axis and having an inlet and an outlet at opposite ends thereof, helical conveyor means fixed to the inner surface of said drum for advancing the supply mixture from said inlet to said outlet, means providing for the introduction of a stream of liquid at said outlet end of the drum for forming a suspension of said fine material in said liquid and thereby separating said fine material from said coarse material, and tubular means at the inlet end of the drum rotatable therewith for discharge of liquid therefrom out of contact with the supply mixture introduced into the drum at said inlet end thereof, and a supply receptacle having an opening communicating with said inlet end of the drum, said conveyor means having a part projecting into said receptacle through said opening thereof for moving material from said receptacle into said drum for the separation operation.

3. Apparatus for separating finely divided material from coarse material contained in a supply mixture of said materials, comprising a drum mounted for rotation about its longitudinal axis and having an inlet and an outlet at opposite ends thereof, said outlet end being elevated above said inlet end, helical conveyor means fixed to the inner surface of said drum for advancing the supply mixture from said inlet to said outlet, means for introducing a stream of water into said drum for effecting the separation of the fine material, and a supply receptacle having an opening communicating with said inlet end of the drum, said conveyor means having a part projecting into said receptacle through said opening thereof for moving material from said receptacle into said drum for the separation operation, tubular means at the inlet end of the drum rotatable therewith for discharging liquid therefrom out of contact with the supply mixture introduced into the drum at said inlet end thereof, said outlet end of said drum having means for lifting said separated coarse material for discharge of said material from said drum.

References Cited in the file of this patent

UNITED STATES PATENTS

| | | |
|---|---|---|
| 2,047,202 | Hardinge | July 14, 1936 |
| 2,136,686 | Hardinge | Nov. 15, 1938 |
| 2,618,388 | Rawlings | Nov. 18, 1952 |